United States Patent
Hong

(10) Patent No.: US 12,256,367 B2
(45) Date of Patent: Mar. 18, 2025

(54) METHODS OF SENDING PAGING SIGNALING, PAGING METHODS, INFORMATION SENDING METHODS AND APPARATUSES THEREOF

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 411 days.

(21) Appl. No.: 17/776,812

(22) PCT Filed: Nov. 15, 2019

(86) PCT No.: PCT/CN2019/118747
§ 371 (c)(1),
(2) Date: May 13, 2022

(87) PCT Pub. No.: WO2021/092888
PCT Pub. Date: May 20, 2021

(65) Prior Publication Data
US 2022/0386273 A1 Dec. 1, 2022

(51) Int. Cl.
*H04W 68/06* (2009.01)
*H04W 72/04* (2023.01)
*H04W 72/0453* (2023.01)

(52) U.S. Cl.
CPC ....... *H04W 68/06* (2013.01); *H04W 72/0453* (2013.01)

(58) Field of Classification Search
CPC ..... H04W 68/06; H04W 68/08; H04W 68/10; H04W 68/12; H04W 68/04; H04W 68/02;
(Continued)

(56) References Cited

U.S. PATENT DOCUMENTS

2014/0378172 A1  12/2014  Lim
2018/0063813 A1*  3/2018  Gupta ................. H04W 60/005
(Continued)

FOREIGN PATENT DOCUMENTS

CN    101500233 A  *  8/2009  ............ H04W 68/02
CN    102812756 A  *  12/2012  ............ H04J 11/005
(Continued)

OTHER PUBLICATIONS

State Intellectual Property Office of the People's Republic of China, Office Action and Search Report Issued in Application No. 2019800030455, Oct. 29, 2021, 15 pages. (Submitted with Machine/Partial Translation).
(Continued)

*Primary Examiner* — Phong La
(74) *Attorney, Agent, or Firm* — Volpe Koenig

(57) ABSTRACT

The present disclosure relates to a method of sending paging signaling, including: receiving first identifier information of a terminal in an authorized frequency band from a base station; sending paging signaling including the first identifier information to the base station. According to the embodiments of the present disclosure, after receiving the first identifier information from the base stations, the core network may send paging signaling to these base stations sending the first identifier information, such that these base stations sending the first identifier information may further broadcast the paging signaling to page the terminal.

17 Claims, 17 Drawing Sheets

(58) Field of Classification Search
CPC ............. H04W 68/00; H04W 72/0453; H04W 72/0446; H04W 72/0457; H04W 72/044
See application file for complete search history.

(56) References Cited

U.S. PATENT DOCUMENTS

| | | | |
|---|---|---|---|
| 2020/0029297 A1* | 1/2020 | Baek | H04W 76/11 |
| 2020/0162900 A1 | 5/2020 | Nakarmi et al. | |
| 2021/0051505 A1* | 2/2021 | Xu | H04W 4/023 |
| 2022/0248376 A1* | 8/2022 | Hui | H04W 72/044 |
| 2022/0264554 A1* | 8/2022 | Hui | H04W 4/02 |
| 2022/0386273 A1* | 12/2022 | Hong | H04W 68/06 |
| 2023/0070783 A1* | 3/2023 | Hui | H04W 72/044 |

FOREIGN PATENT DOCUMENTS

| | | | | |
|---|---|---|---|---|
| CN | 105188138 A | * | 12/2015 | |
| CN | 106470480 A | | 3/2017 | |
| CN | 106658620 A | | 5/2017 | |
| CN | 107623946 A | | 1/2018 | |
| CN | 107734641 A | | 2/2018 | |
| CN | 109429174 A | | 3/2019 | |
| CN | 109479190 A | * | 3/2019 | ............. H04W 60/00 |
| CN | 109640246 A | * | 4/2019 | ......... G06Q 30/0281 |
| CN | 109804701 A | * | 5/2019 | ............... H04L 1/00 |
| CN | 110313201 A | * | 10/2019 | ........ H04W 28/0808 |
| EP | 2466976 A1 | * | 6/2012 | ............. H04W 68/00 |
| EP | 3337282 A1 | | 6/2018 | |
| EP | 3566409 A1 | | 11/2019 | |
| WO | 2009097759 A1 | | 8/2009 | |
| WO | 2011/095031 A1 | | 8/2011 | |
| WO | 2012162976 A1 | | 12/2012 | |
| WO | 2018028677 A1 | | 2/2018 | |
| WO | 2018/127453 A1 | | 7/2018 | |
| WO | WO-2019223769 A1 | * | 11/2019 | ............ H04W 12/02 |

OTHER PUBLICATIONS

ISA State Intellectual Property Office of the People's Republic of China, International Search Report Issued in Application No. PCT/CN2019/118747, Aug. 5, 2020, WIPO, 5 pages.

Intellectual property India, Office Action Issued in Application No. 202247031714, Sep. 20, 2022, 5 pages. (Submitted with Partial Machine Translation).

ISA State Intellectual Property Office of the People's Republic of China, Written Opinion of the International Searching Authority Issued in Application No. PCT/CN2019/118747, Aug. 5, 2020, WIPO, 8 pages.(Submitted with Machine Translation).

European Patent Office, Extended European Search Report Issued in Application No. 19952499.2, Jun. 14, 2023, Germany, 10 pages.

* cited by examiner

METHODS OF SENDING PAGING SIGNALING, PAGING METHODS, INFORMATION SENDING METHODS AND APPARATUSES THEREOF

CROSS REFERENCE TO RELATED APPLICATIONS

The present application is a U.S. National Stage of International Application No. PCT/CN2019/118747 filed on Nov. 15, 2019, the contents of which are incorporated herein by reference in its entireties for all purposes.

TECHNICAL FIELD

The present disclosure relates to the field of communication technologies, in particular, to methods of sending paging signaling, paging methods, information sending methods, apparatuses for sending a paging signaling, paging apparatuses, information sending apparatuses, and electronic devices.

BACKGROUND

In the related arts, when a core network is to page a terminal, the core network firstly determines a tracking area (TA) where the terminal is located, and then sends paging signaling carrying identifier information of the terminal to all base stations in the tracking area and further, the base stations broadcast the paging signaling. After receiving the paging signaling, the terminal may determine, based on the identifier information in the paging signaling, whether the base stations are paging the terminal.

SUMMARY

In view of this, embodiments of the present disclosure provide methods of sending paging signaling, paging methods, information sending methods, apparatuses for sending paging signaling, paging apparatuses, information sending apparatuses and electronic devices.

According to a first aspect of the present disclosure, there is provided a method of sending paging signaling, which is applicable to a core network. The method includes:
receiving first identifier information of a terminal in an authorized frequency band from a base station; and
sending paging signaling including the first identifier information to the base station.

According to a second aspect of the present disclosure, there is provided a paging method which is applicable to a base station. The method includes:
receiving first identifier information of a terminal in an authorized frequency band from a wireless access point of a non-authorized frequency band;
sending the first identifier information to a core network;
receiving paging signaling including the first identifier information from the core network; and
broadcasting the paging signaling.

According to a third aspect of the present disclosure, there is provided an information sending method, which is applicable to a wireless access point of a non-authorized frequency band. The method includes:
receiving first identifier information sent by a terminal through the non-authorized frequency band, wherein the first identifier information is identifier information of the terminal in an authorized frequency band; and
sending the first identifier information to a base station.

According to a fourth aspect of the present disclosure, there is provided an electronic device, including:
a processor; and
a memory storing instructions executable by the processor;
where the processor is configured to implement the method of sending paging signaling according to any one of the above embodiments.

According to a fifth aspect of the present disclosure, there is provided an electronic device, including:
a processor; and
a memory storing instructions executable by the processor;
where the processor is configured to implement the paging method according to any one of the above embodiments.

According to a sixth aspect of the present disclosure, there is provided an electronic device, including:
a processor; and
a memory storing instructions executable by the processor;
where the processor is configured to implement the information sending method according to any one of the above embodiments.

BRIEF DESCRIPTION OF THE DRAWINGS

To describe the technical solutions in the embodiments of the present disclosure more clearly, drawings required in descriptions of the embodiments of the present disclosure will be briefly introduced below. It is apparent that the drawings described below are merely some embodiments of the present disclosure and other drawings may be obtained by those of ordinary skill in the related art based on these drawings in the examples of the present disclosure.

DETAILED DESCRIPTION OF THE EMBODIMENTS

Figure 1:
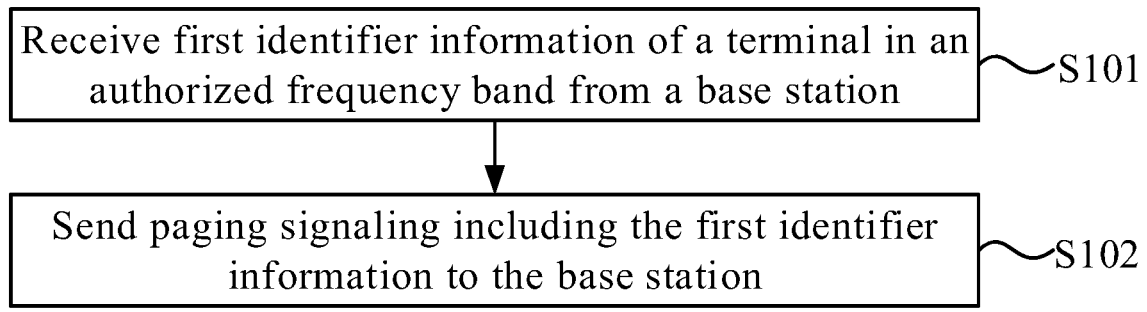
FIG. 1 is a flowchart illustrating a method of sending paging signaling according to an example of the present disclosure.

The technical solution of the embodiments of the present disclosure will be clearly and fully described in combination with the accompanying drawings in the embodiments of the present disclosure. Apparently, the embodiments described herein are merely some embodiments rather than all embodiments. Other embodiments obtained by those skilled in the art based on these embodiments of the present disclosure without making creative work shall all fall within the scope of protection of the present disclosure.

The present disclosure involves a scenario in which a core network pages a terminal. But the core network is to use a base station to page the terminal. Specifically, the core network sends paging signaling carrying identifier information of the terminal to be paged to the base station. After receiving the paging signaling, the base station may broadcast the paging signaling such that the terminal receives the paging signaling.

After receiving the paging signaling, a terminal A may determine whether the identifier information carried in the paging signaling is the identifier information of the terminal A. If it is the identifier information of the terminal A, it is determined that the paging signaling is used to page the terminal A. Thus, the terminal A may establish a communication connection with the base station (for example, the terminal A is in an idle state) or update a system message (for example, the terminal A is in a connected state).

In an example of the present disclosure, the core network may further determine which base stations to which the paging signaling is to be sent.

A terminal may communicate with a wireless access point of a non-authorized frequency band through the non-authorized frequency band and send its first identifier information in an authorized frequency band to the wireless access point. Further, the terminal may also monitor paging signaling broadcast by a base station in an authorized frequency band.

The wireless access point may communicate with the base station through an Xw interface or internet, and further send the received first identifier information to the base station.

The base station may communicate with the core network through S1 interface (e.g. in a 4G network) or NG interface (for example, in a 5G network), and further send the received first identifier information to the core network. Furthermore, the base station may also receive paging signaling including the first identifier information from the core network.

The core network may, after receiving the first identifier information from the base station, determine the base station sending the first identifier information, and determine the base station sending the first identifier information as a base station to which paging signaling is to be sent, and further send paging signaling including the first identifier information to the base station sending the first identifier information, such that the base station broadcasts the paging signaling to page a terminal corresponding to the first identifier information.

The implementation of the present disclosure will be illustrated below from the perspective of core network, base station and wireless access point respectively.

FIG. 1 is a flowchart illustrating a method of sending paging signaling according to an example of the present disclosure. The method shown in this example may be applied to a core network. The core network may be a 4G core network or a 5G core network.

As shown in FIG. 1, the method of sending paging signaling may include the following steps.

At step S101, first identifier information of a terminal in an authorized frequency band is received from a base station.

At step S102, paging signaling including the first identifier information is sent to the base station.

In an example, the terminal may, as a Station (STA), communicate with a wireless access point (AP) of a non-authorized frequency band through the non-authorized frequency band. During the communication, the terminal may send its first identifier information in an authorized frequency band (for example, a frequency band in an operator network) to the wireless access point through the non-authorized frequency band.

The terminal may include but is not limited to an electronic device such as a smart phone, a tablet computer and a wearable device and the like. The non-authorized frequency band includes but is not limited to a Wi-Fi frequency band and a Bluetooth frequency band and the like. With the Wi-Fi frequency band as the non-authorized frequency band, the wireless access point of the non-authorized frequency band may be a router.

In an example, an identifier in the first identifier information may be a temporary identifier or a permanent identifier.

The temporary identifier is an identifier which is configured for a terminal to allow the terminal to show its identity temporarily in some scenarios or some networks. For example, if the terminal communicates based on 4G protocol, the temporary identifier may be a 4G temporary identifier; for example, if the terminal communicates based on 5G protocol, the temporary identifier may be a 5G temporary identifier. The terminal communicates based on the temporary identifier, which is helpful to avoiding any loss resulting from acquisition of the permanent identifier by the outlaws during a communication process.

The permanent identifier includes but is not limited to an International Mobile Subscriber Identity (IMSI), an International Mobile Equipment Identity (IMEI) and the like.

In an example, after determining its first identifier information in the authorized frequency band, the terminal may send the first identifier information to the wireless access point of the non-authorized frequency band through the non-authorized frequency band. With the Wi-Fi frequency band as the non-authorized frequency band, the terminal may send the first identifier information by management frames and/or control frames in IEEE802.11 protocol.

In some examples, in a case of being in an idle state, the terminal may send the first identifier information to the wireless access point.

According to the embodiments of the present disclosure, after receiving first identifier information of a terminal in an authorized frequency band from a base station, a core network may send paging signaling to these base stations sending the first identifier information, such that these base stations sending the first identifier information can further broadcast the paging signaling to page the terminal. In this way, these base stations sending the first identifier information can be specifically controlled to page a terminal without controlling all base stations in the tracking area to page the terminal. Thus, the operation of controlling the base stations to page a terminal is more specific and in some cases, is helpful to resource saving.

Figure 2:
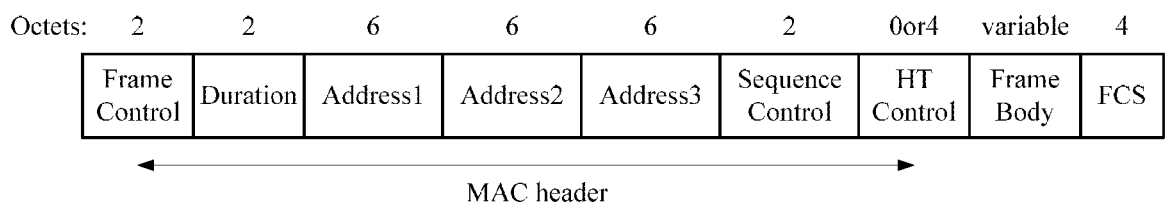
FIG. 2 is a flowchart illustrating a management frame according to an example of the present disclosure.

FIG. 2 is a diagram illustrating a management frame according to an example of the present disclosure.

As shown in FIG. 2, with an Association Request frame as a management frame, the management frame includes fields such as Frame Control, Duration and Address1, and the characters on each field identify a number of bytes corresponding to the field, where the number of bytes of the Frame Body field is variable. In this case, the terminal may add the first identifier information to the Frame Body field and send the management frame to the wireless access point.

In an example, after receiving the first identifier information from the terminal, the wireless access point may send the first identifier information to the base station, for example, send the first identifier information to the base station via an application layer interface (specifically Internet), or send the first identifier information to the base station via another interface (e.g. Xw interface).

Figure 3:
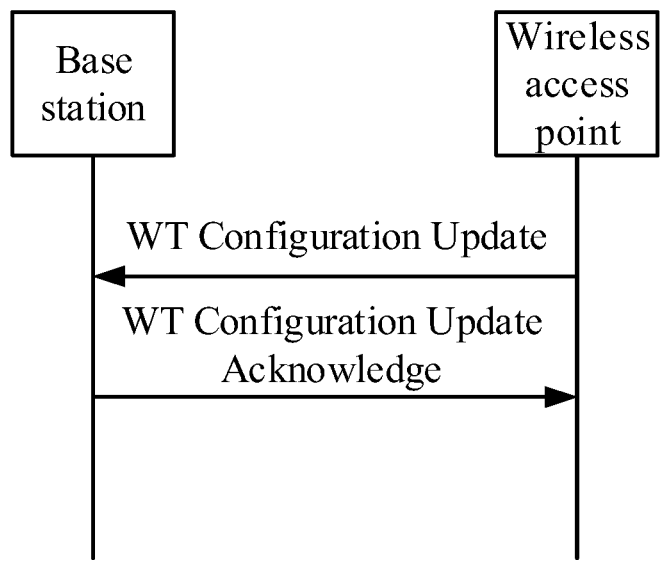
FIG. 3 is a diagram in which a wireless access point sends first identifier information to a base station according to an example of the present disclosure.

FIG. 3 is a diagram in which a wireless access point sends first identifier information to a base station according to an example of the present disclosure.

As shown in FIG. 3, the wireless access point may serve as a WLAN Termination (WT) to communicate with the base station via the Xw interface. Hence, the wireless access point may send the first identifier information to the base station via the Xw interface. For example, the first identifier information may be carried in WT Status Report signaling. Specifically, the first identifier information may be carried in WT Configuration Update signaling of the WT Status Report signaling. After receiving the WT Configuration Update signaling, the base station may feed back confirmation information, for example, WT Configuration Update Acknowledge signaling, to the wireless access point.

Further, after receiving the first identifier information of the terminal in an authorized frequency band from the wireless access point, the base stations may send the first identifier information to the core network. After receiving the first identifier information, the core network may determine which base stations send the received first identifier information, and further send paging signaling to the base stations sending the first identifier information, for example, send paging signaling to the base stations via an S1 interface or NG interface, such that the base stations sending the first identifier information may further broadcast the paging signaling to page the terminal.

According to an example of the present disclosure, after receiving the first identifier information of the terminal in the authorized frequency band from the base stations, the core network may send a paging signaling to these base stations sending the first identifier information such that these base stations sending the first identifier information can further broadcast the paging signaling to page the terminal. Hence, the base stations sending the first identifier information can be specifically controlled to page a terminal without controlling all base stations in the tracking area to page the terminal. Thus, the operation of controlling the base stations to page a terminal is more specific and in some cases (for example, the base stations sending the first identifier information are fewer than the base stations in the tracking area), is helpful to resource saving.

Figure 4:
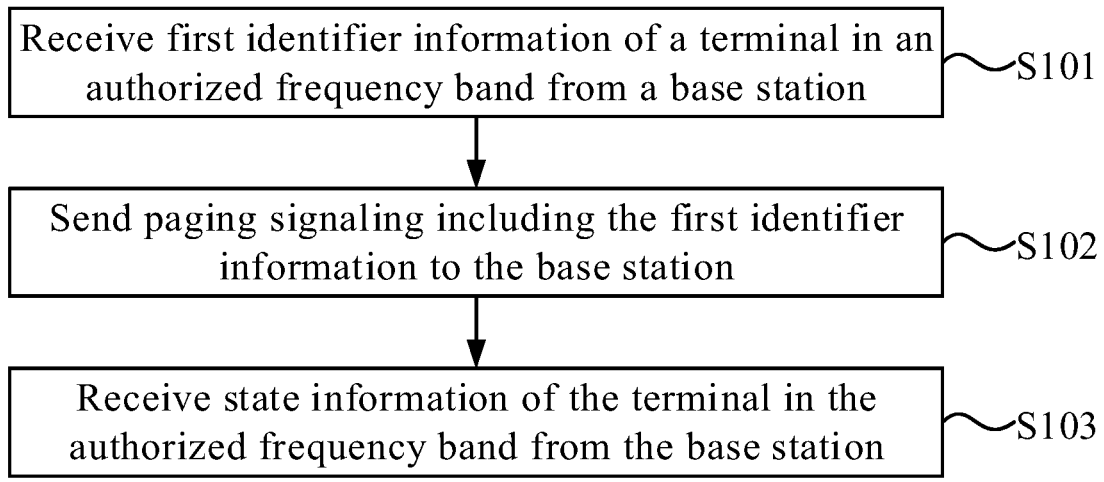
FIG. 4 is a flowchart illustrating another method of sending paging signaling according to an example of the present disclosure.

FIG. 4 is a flowchart illustrating another method of sending paging signaling according to an example of the present disclosure. As shown in FIG. 4, the method further includes the following step.

At step S103, state information of the terminal in the authorized frequency band is received from the base station.

In an example, the terminal may also send its state information in the authorized frequency band to the wireless access point of the non-authorized frequency band through the non-authorized frequency band, where the state information may be state information of radio resource control (RRC) layer, including but not limited to connected state, idle state and non-activated state and the like.

After receiving the state information, the wireless access point may send the state information to the base station, and the base station may further send the state information to the core network. Although, in normal circumstances, the core network may automatically obtain the state information of the terminal in the authorized frequency band, the core network cannot automatically obtain the state information of the terminal in the authorized frequency band in some special cases. As a result, according to the example, the state information can be sent to the core network, helping the core network to determine the state information of the terminal.

It is noted that the manner in which the wireless access point sends the state information to the base station is same as the manner in which the wireless access point sends the first identifier information to the base station, and further, the first identifier information and the state information may be sent at the same time or separately; the manner in which the base station sends the state information to the core network is same as the manner in which the base station sends the first identifier information to the core network, and further, the first identifier information and the state information can be sent at the same time or separately.

Figure 5:
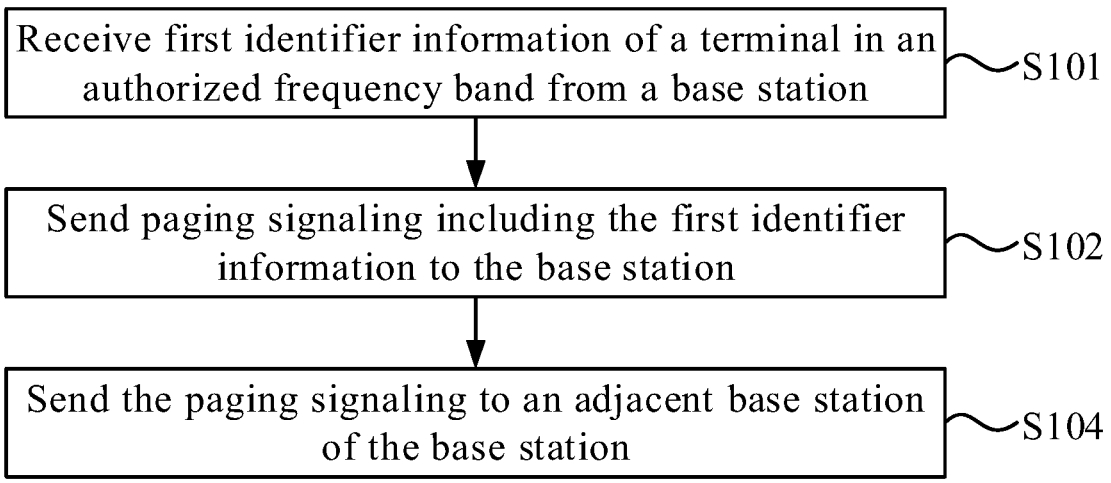
FIG. 5 is a flowchart illustrating another method of sending paging signaling according to an example of the present disclosure.

FIG. 5 is a flowchart illustrating another method of sending paging signaling according to an example of the present disclosure. As shown in FIG. 5, the method further includes the following step.

At step S104, the paging signaling is sent to an adjacent base station of the base station.

In an example, the core network may send the paging signaling to both the base station sending the first identifier information and an adjacent base station of the base station, such that the adjacent base station can also page the terminal corresponding to the first identifier information, thereby improving a success rate of obtaining the terminal by paging.

Figure 6:
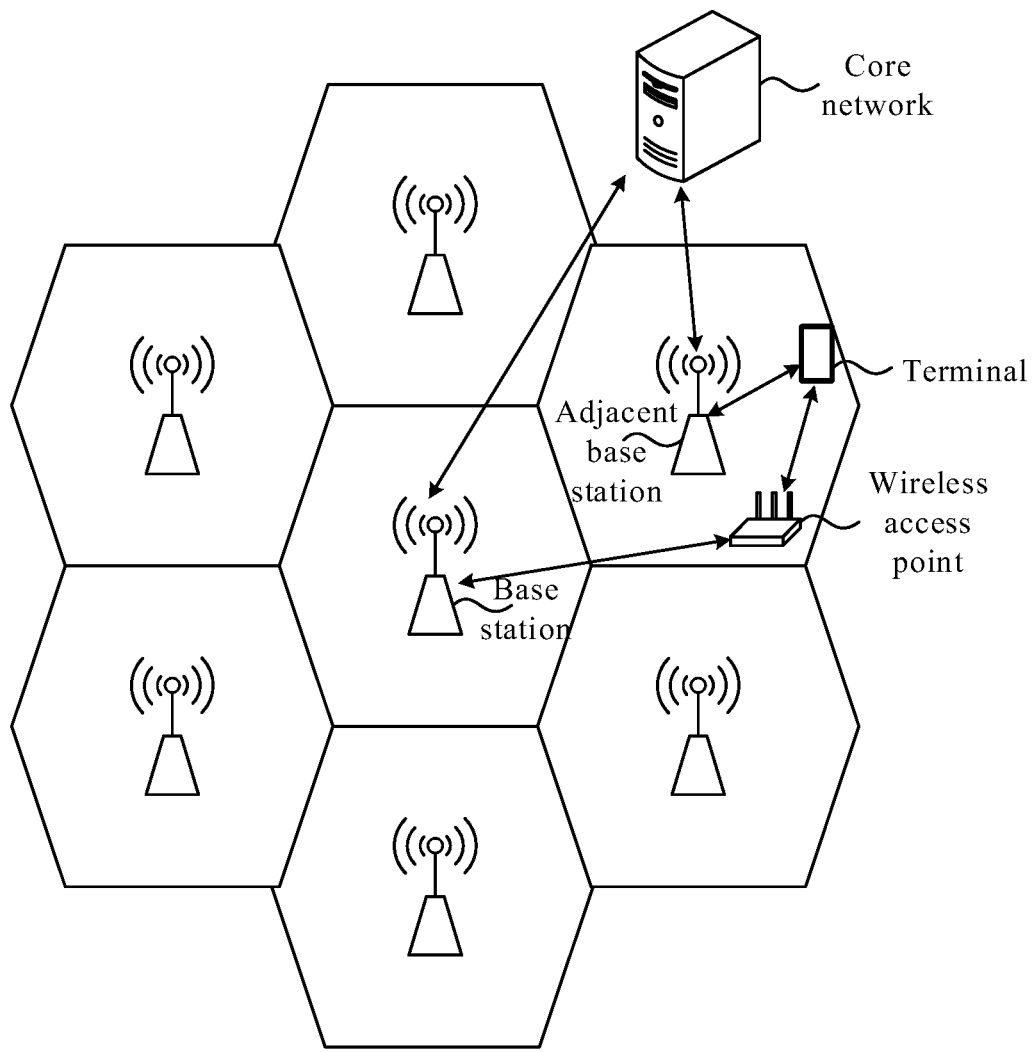
FIG. 6 is a diagram illustrating an adjacent base station according to an example of the present disclosure.

FIG. 6 is a diagram illustrating an adjacent base station according to an example of the present disclosure.

As shown in FIG. 6, in a cellular network, adjacent base stations of the base station may surround the base station. If the paging signaling is sent only to the base station sending the first identifier information, since one base station has a smaller signal coverage, the terminal may not be within the signal coverage of the base station but within the signal coverage of the adjacent base stations of the base station. In this case, if the terminal is paged only by the base station, there will be a low success rate. Thus, the paging signaling may also be sent to the adjacent base stations, so as to improve the success rate of obtaining the terminal by paging.

Figure 7:
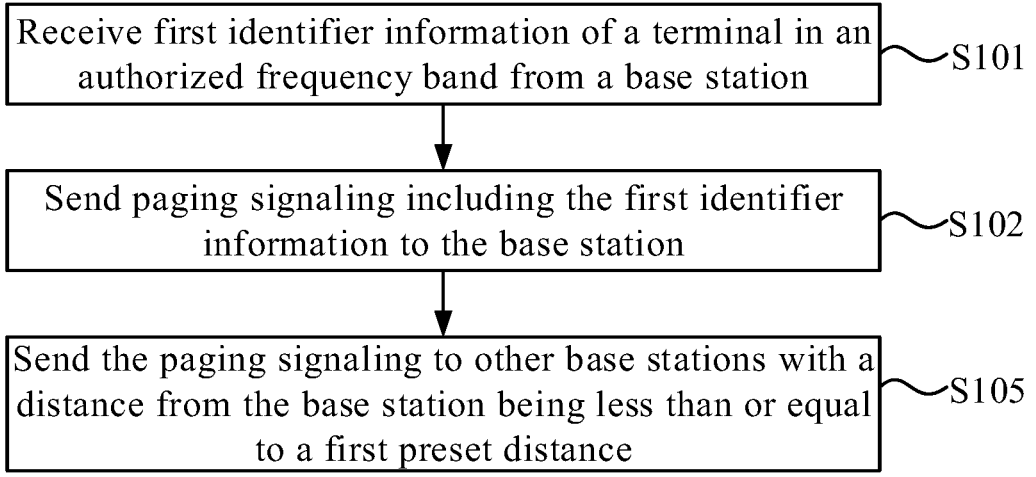
FIG. 7 is a flowchart illustrating another method of sending paging signaling according to an example of the present disclosure.

FIG. 7 is a flowchart illustrating another method of sending paging signaling according to an example of the present disclosure. As shown in FIG. 7, the method further includes the following step.

At step S105, the paging signaling is sent to other base stations with a distance from the base station being less than or equal to a first preset distance.

In an example, the core network may send the paging signaling to not only the base station sending the first identifier information but also to other base stations near the base station (for example, less than or equal to the first preset distance), such that other base stations can also page the terminal corresponding to the first identifier information, thus improving the success rate of obtaining the terminal by paging.

Figure 8:
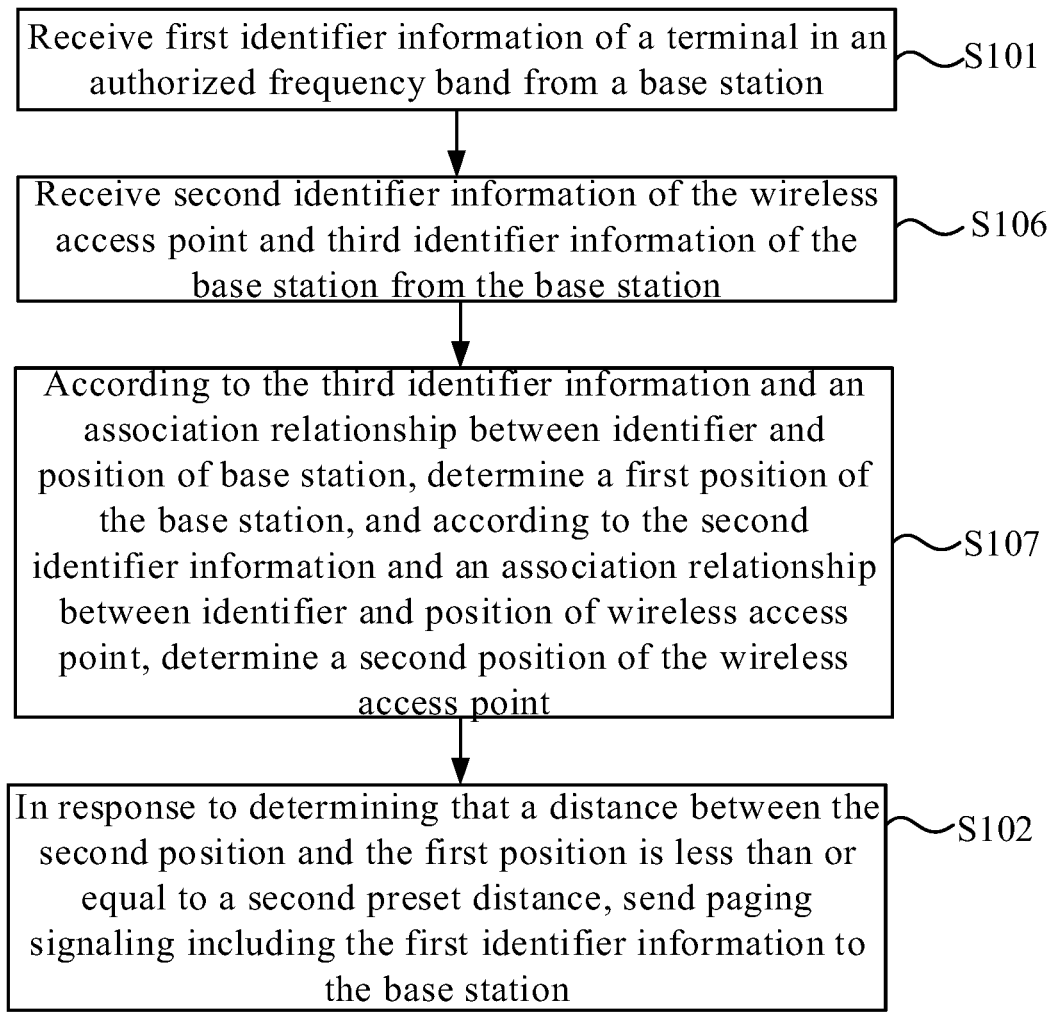
FIG. 8 is a flowchart illustrating another method of sending paging signaling according to an example of the present disclosure.

FIG. 8 is a flowchart illustrating another method of sending paging signaling according to an example of the present disclosure. As shown in FIG. 8, the method further includes the following steps.

At step S106, second identifier information of the wireless access point and third identifier information of the base station are received from the base station.

At step S107, according to the third identifier information and an association relationship between identifier and position of base station, a first position of the base station is determined, and according to the second identifier information and an association relationship between identifier and position of wireless access point, a second position of the wireless access point is determined.

In response to that a distance between the second position and the first position is less than or equal to a second preset distance, the paging signaling including the first identifier information is sent to the base station.

In an example, the wireless access point may send its second identifier information to the base station, and the base station may send the second identifier information together with its third identifier information to the core network. The core network may pre-store an association relationship between identifier and position of base station, and an association relationship between identifier and position of wireless access point.

In this case, the first position of the base station may be determined by querying, based on the third identifier information, for a position corresponding to the third identifier information in the association relationship between identifier and position of base station, and the second position of the wireless access point may be determined by querying, based on the second identifier information, for a position corresponding to the second identifier information in the association relationship between identifier and position of wireless access point.

After the first position and the second position are determined, a distance between the second position and the first position may be determined. When a distance between the second position and the first position is small (for example, less than or equal to the second preset distance), the wireless access point is determined to be near the base station. The terminal may communicate with the wireless access point through a non-authorized frequency band. Since the coverage of the non-authorized frequency band is usually small, the terminal is usually located near the wireless access point. Since the wireless access point is near the base station, the terminal is also located near the base station. Thus, the paging signaling including the first identifier information may be sent to the base station and the base station may broadcast the paging signaling. In this way, it is guaranteed that the terminal can receive the paging signaling from the base station.

It is noted that receiving the second identifier information of the wireless access point and the third identifier information of the base station from the base station and receiving the first identifier information may be performed at the same time or separately.

Figure 9:
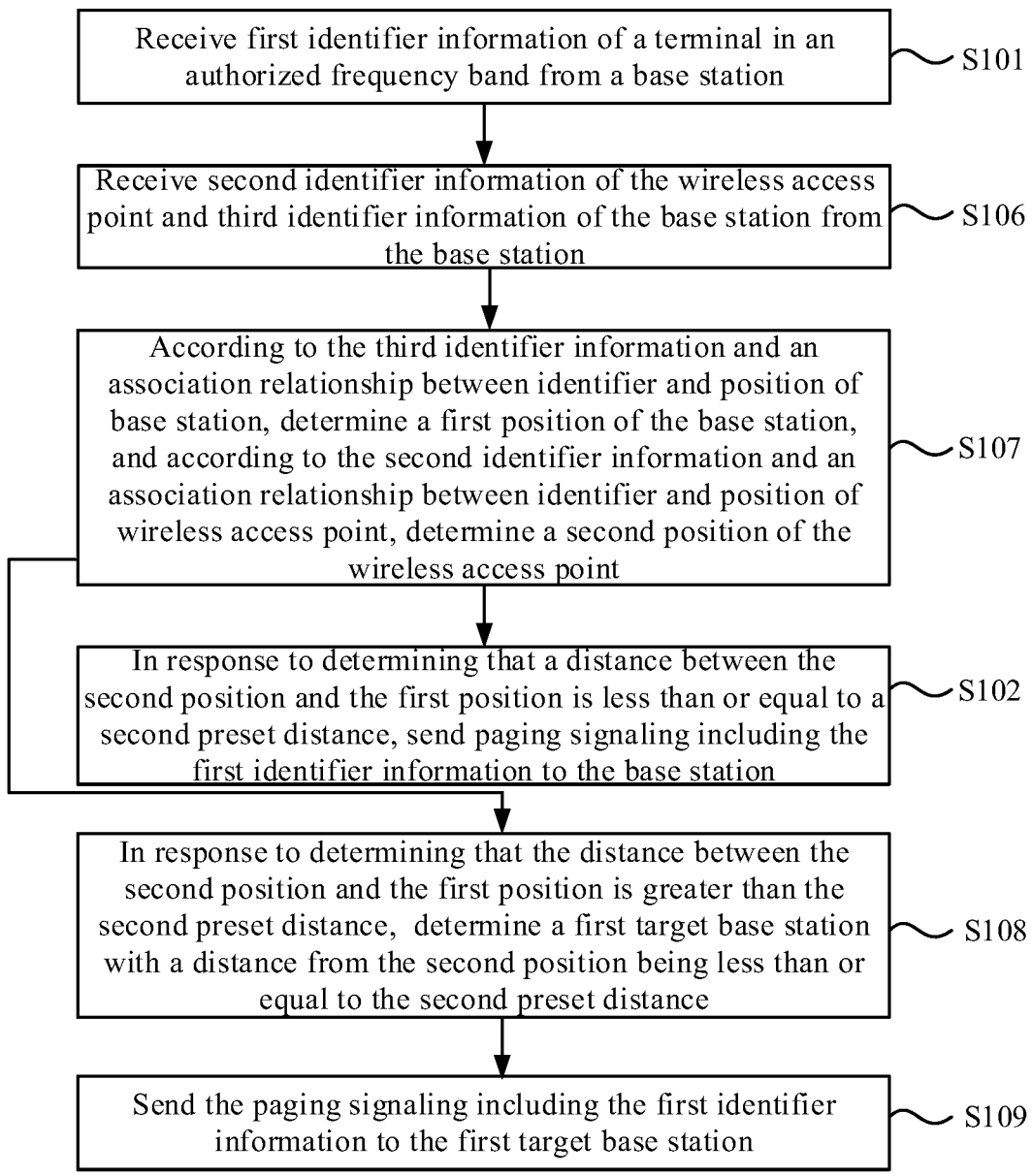
FIG. 9 is a flowchart illustrating another method of sending paging signaling according to an example of the present disclosure.

FIG. 9 is a flowchart illustrating another method of sending paging signaling according to an example of the present disclosure. As shown in FIG. 9, the method further includes the following steps.

At step S108, in response to a condition that the distance between the second position and the first position is greater than the second preset distance, a first target base station with a distance from the second position being less than or equal to the second preset distance is determined.

At step S109, the paging signaling including the first identifier information is sent to the first target base station.

In an example, when the distance between the second position and the first position is large (for example, greater than the second preset distance), the wireless access point is determined to be far from the base station and the terminal is thus far from the base station. Therefore, the first target base station with a distance from the second position being less than or equal to the second preset distance may be determined. If the first target base station is determined, the terminal is located near the first target base station. Thus, the paging signaling including the first identifier information may be sent to the first target base station and the first target base station may broadcast the paging signaling. In this way, it is guaranteed that the terminal can receive the paging signaling from the base station.

It is noted that one or more first target base stations may be determined. When a plurality of first target base stations are determined, the paging signaling may be sent to the plurality of first target base stations. Alternatively, a first target base station nearest the second position is further determined from the plurality of first target base stations and then the paging signaling is sent to the first target base station nearest the second position.

Figure 10:
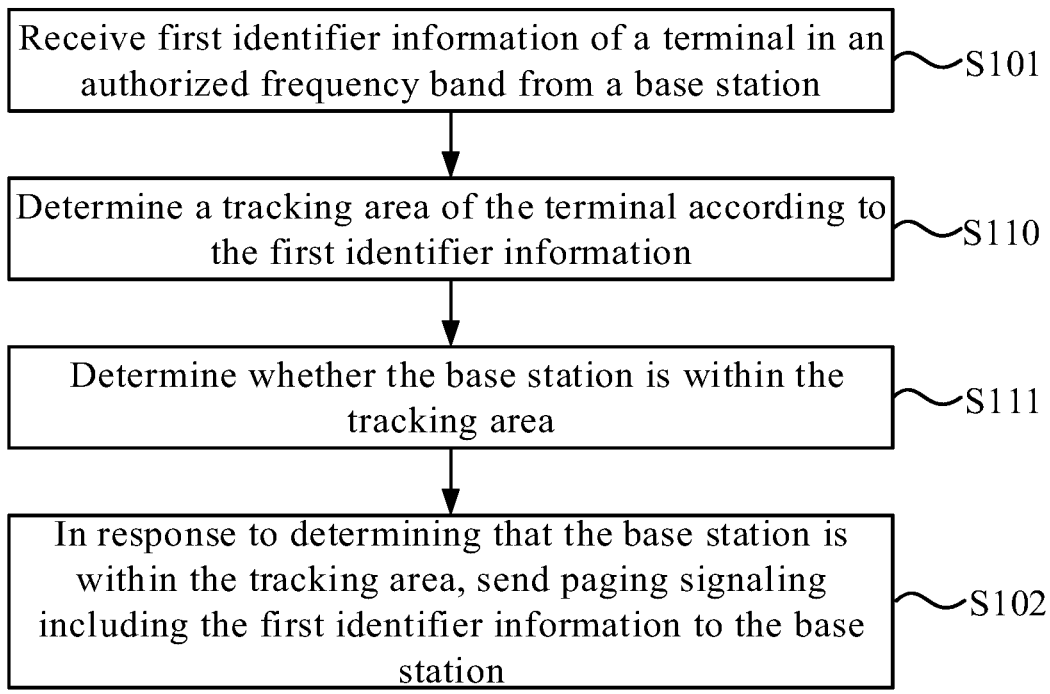
FIG. 10 is a flowchart illustrating another method of sending paging signaling according to an example of the present disclosure.

FIG. 10 is a flowchart illustrating another method of sending a paging signaling according to an example of the present disclosure. As shown in FIG. 10, the method further includes the following steps.

At step S110, a tracking area of the terminal is determined according to the first identifier information.

At step S111, whether the base station is within the tracking area is determined.

In response to determining that the base station is within the tracking area, the paging signaling including the first identifier information is sent to the base station.

In an example, the core network may determine the tracking area of the terminal according to the first identifier information of the terminal, and further determine whether the base station sending the first identifier information is within the tracking area. Since the terminal can only receive the paging signaling from the base station within the tracking area where the terminal is located, in response to that the base station is within the tracking area, the paging signaling including the first identifier information can be sent to the base station.

Figure 11:
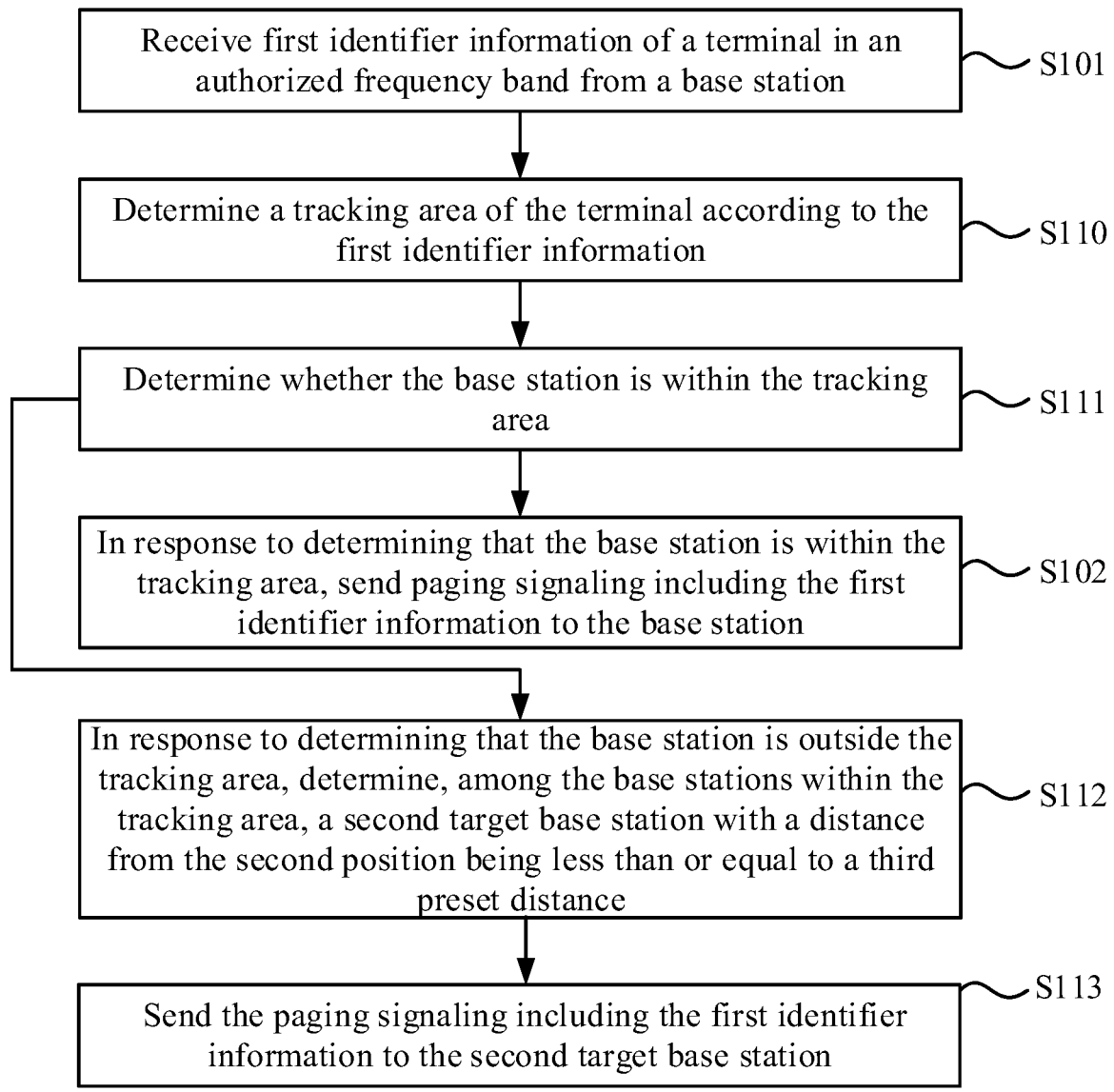
FIG. 11 is a flowchart illustrating another method of sending paging signaling according to an example of the present disclosure.

FIG. 11 is a flowchart illustrating another method of sending paging signaling according to an example of the present disclosure. As shown in FIG. 11, the method further includes the following steps.

At step S112, in response to a condition that the base station is outside the tracking area, a second target base station with a distance from the second position being less than or equal to a third preset distance is determined among the base stations within the tracking area.

At step S113, the paging signaling including the first identifier information is sent to the second target base station.

In an example, when the base station sending the first identifier information is outside the tracking area, since the terminal cannot receive the paging signaling from the base station, the core network may not send the paging signaling to the base station but further determine, in the tracking area, a second target base station near the second position (for example, less than or equal to the third preset distance), and then send the paging signaling including the first identifier information to the second target base station. Thus, the second target base station can broadcast the paging signaling. In this way, it is guaranteed that the terminal can receive the paging signaling from the base station.

It is noted that one or more second target base stations may be determined. When a plurality of second target base stations are determined, the paging signaling may be sent to the plurality of second target base stations. Alternatively, a second target base station nearest the second position is further determined from the plurality of second target base stations and then the paging signaling is sent to the second target base station nearest the second position.

Figure 12:
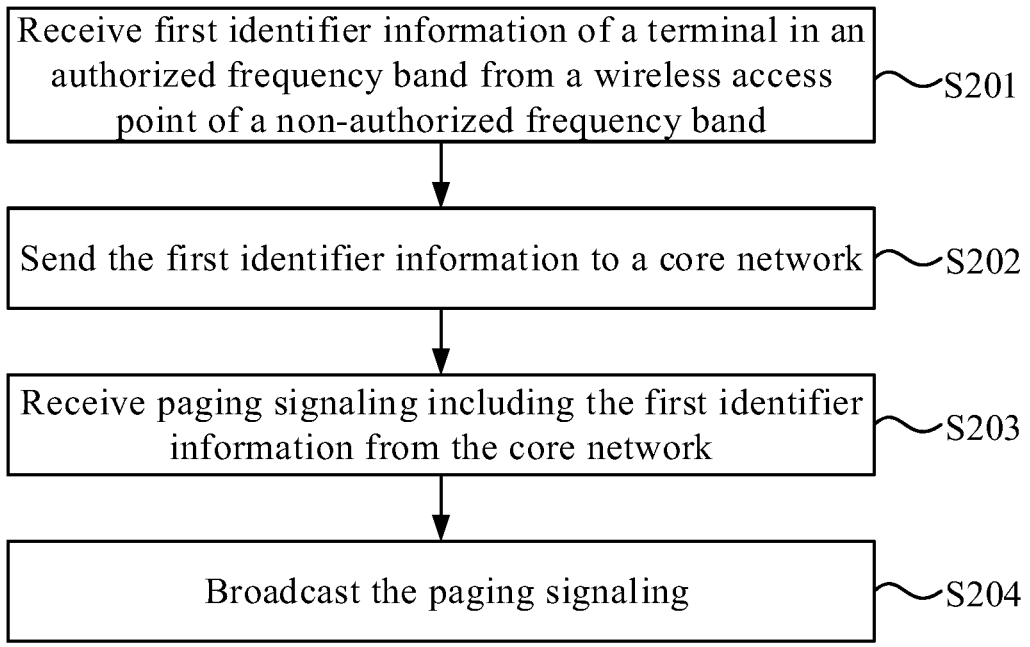
FIG. 12 is a flowchart illustrating paging method according to an example of the present disclosure.

FIG. 12 is a flowchart illustrating a paging method according to an example of the present disclosure. The paging method in this example may be applied to a base station. The base station may communicate with the core network of any one of the above examples. The base station may also communicate with a wireless access point or terminal, for example, communicate with the terminal based on 4G protocol or 5G protocol.

As shown in FIG. 12, the paging method may include the following steps.

At step S201, first identifier information of a terminal in an authorized frequency band is received from a wireless access point of a non-authorized frequency band.

At step S202, the first identifier information is sent to a core network.

At step S203, paging signaling including the first identifier information is received from the core network.

At step S204, the paging signaling is broadcast.

In an example, after receiving the first identifier information of the terminal in an authorized frequency band from the wireless access point, the base station may send the first identifier information to the core network. After receiving the first identifier information, the core network may determine which base stations send the received first identifier information, and further send the paging signaling to these base stations sending the first identifier information. In this way, these base stations sending the first identifier information can further broadcast the paging signaling to page the terminal.

According to the examples of the present disclosure, after base stations send first identifier information to a core network, the core network may send paging signaling to these base stations sending the first identifier information, such that these base stations sending the first identifier information can further broadcast the paging signaling to page the terminal. In this way, these base stations sending the first identifier information can be specifically controlled to page a terminal without controlling all base stations in the tracking area to page the terminal. Thus, the operation of controlling the base stations to page a terminal is more specific and in some cases (for example, when the base stations sending the first identifier information are fewer than the base stations in the tracking area), is helpful to resource saving.

Figure 13:
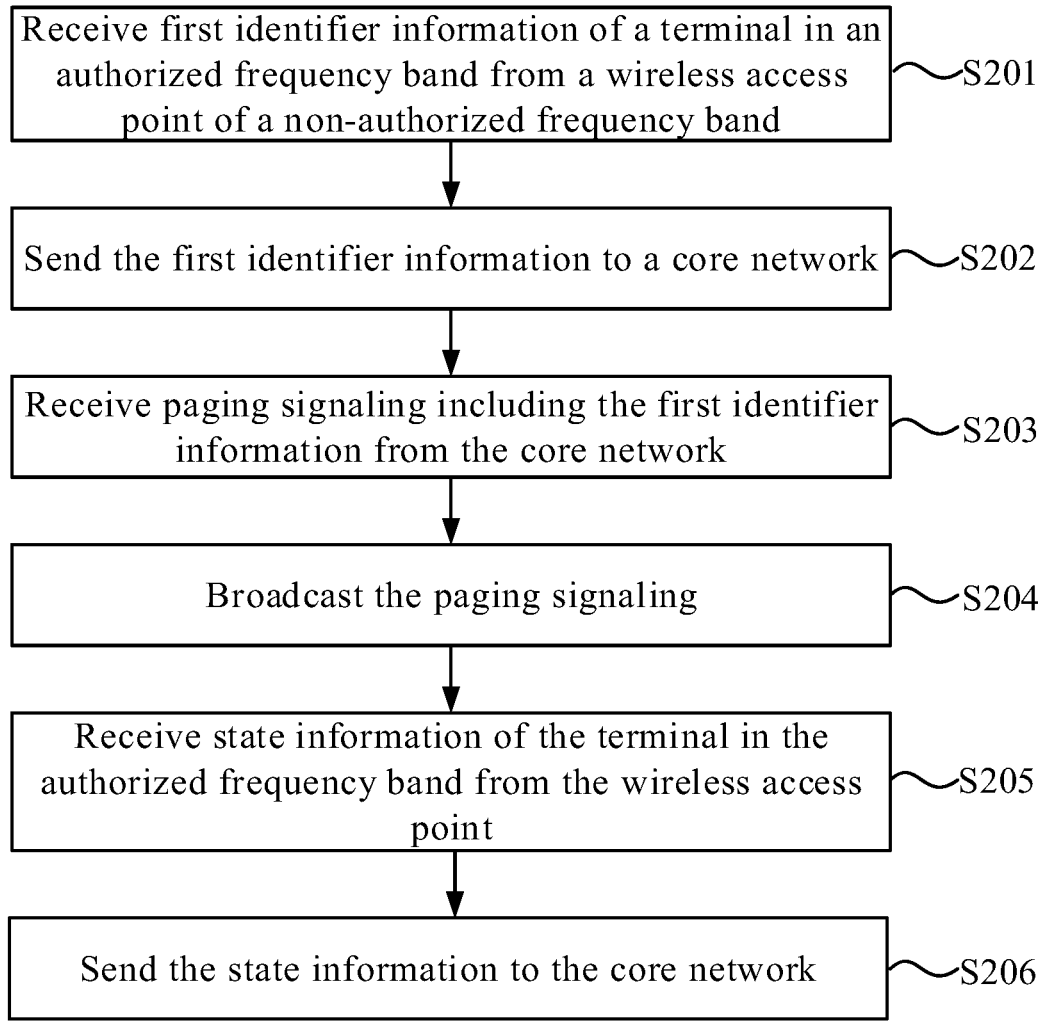
FIG. 13 is a flowchart illustrating another paging method according to an example of the present disclosure.

FIG. 13 is a flowchart illustrating another paging method according to an example of the present disclosure. As shown in FIG. 13, the method further includes the following steps.

At step S205, state information of the terminal in the authorized frequency band is received from the wireless access point.

At step S206, the state information is sent to the core network.

In an example, the terminal may also send its state information in the authorized frequency band to the wireless access point of the non-authorized frequency band through the non-authorized frequency band, where the state information may be state information of radio resource control layer, including but not limited to connected state, idle state and non-activated state and the like.

After receiving the state information, the wireless access point may send the state information to the base station, and the base station may further send the state information to the core network. Although, in normal circumstances, the core network may automatically obtain the state information of the terminal in the authorized frequency band, the core network cannot automatically obtain the state information of the terminal in the authorized frequency band in some special cases. As a result, according to the example, the state information can be sent to the core network, helping the core network to determine the state information of the terminal.

It is noted that, the above steps S205 and S206 may be performed in a sequence adjusted based on actual requirements. For example, as shown in FIG. 13, the step S205 may be performed after the step S204 or performed together with the step S201 at the same time.

Figure 14:
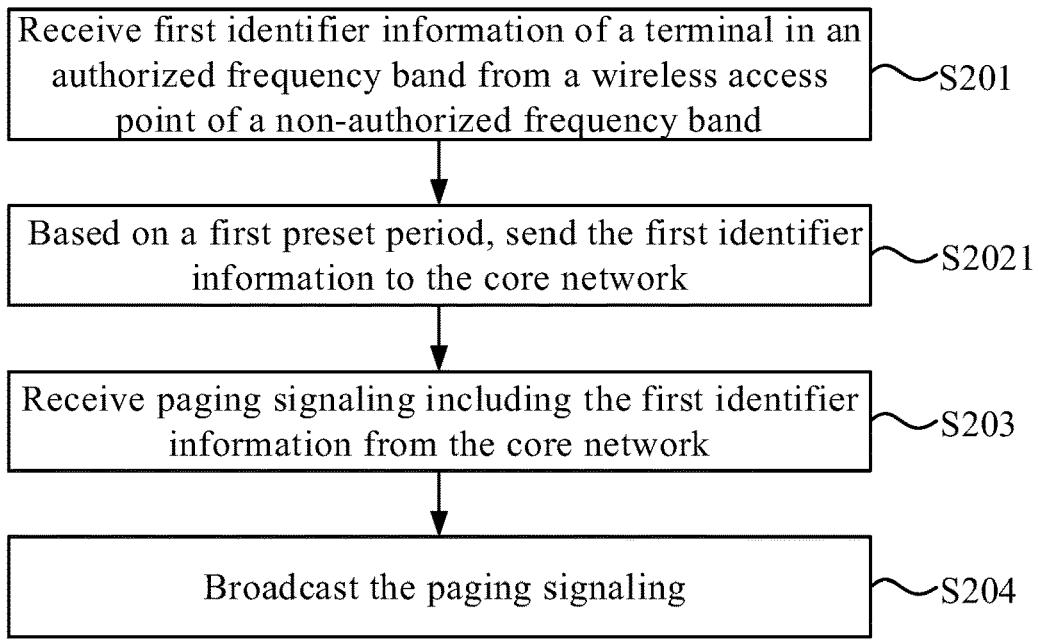
FIG. 14 is a flowchart illustrating another paging method according to an example of the present disclosure.

FIG. 14 is a flowchart illustrating another paging method according to an example of the present disclosure. As shown in FIG. 14, sending the first identifier information to the core network includes the following step.

At step S2021, based on a first preset period, the first identifier information is sent to the core network.

In an example, the base station may send the first identifier information to the core network based on the first preset period, where the first preset period may be configured for the base station by the core network.

Figure 15:
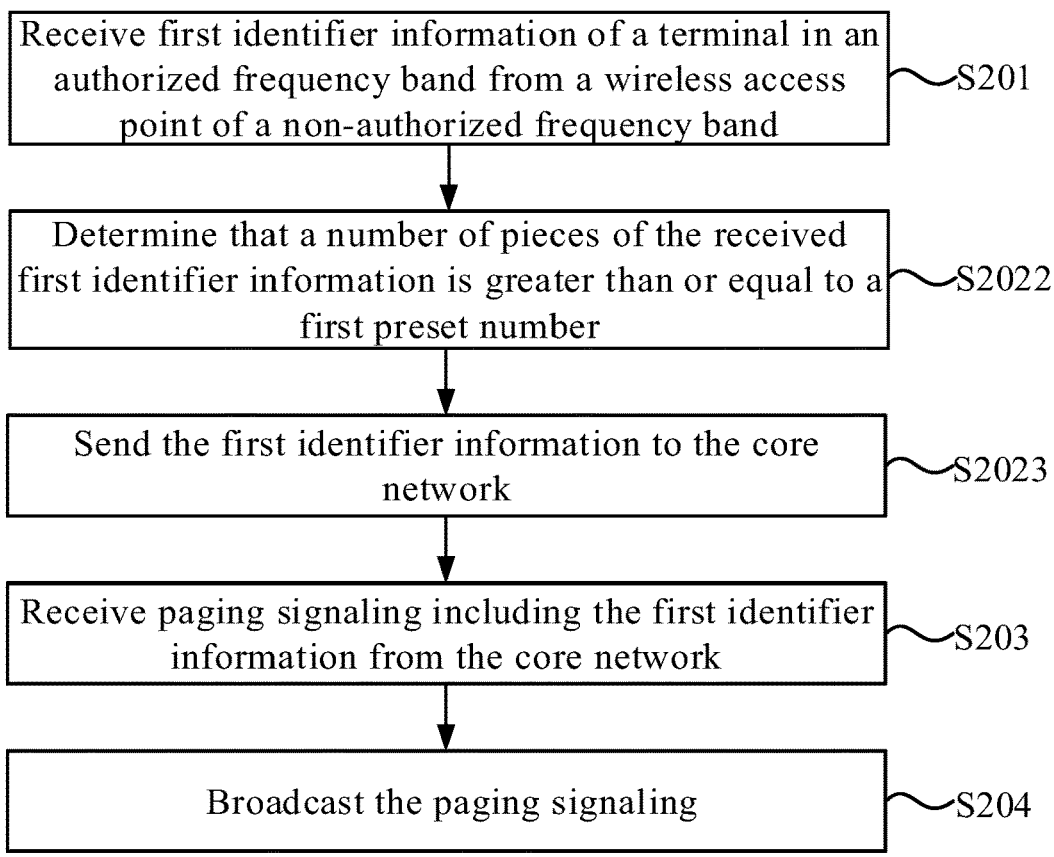
FIG. 15 is a flowchart illustrating another paging method according to an example of the present disclosure.

FIG. 15 is a flowchart illustrating another paging method according to an example of the present disclosure. As shown in FIG. 15, sending the first identifier information to the core network includes the following steps.

At step S2022, it is determined that a number of pieces of the received first identifier information is greater than or equal to a first preset number.

At step S2023, the first identifier information is sent to the core network.

In an example, the base station may store the received first identifier information, and then send the stored first identifier information to the core network when the number of pieces of the stored first identifier information is large (for example, greater than or equal to the first preset number). In this way, it is helpful to reduce a communication frequency between the base station and the core network. The first preset number may be configured for the base station by the core network.

Figure 16:
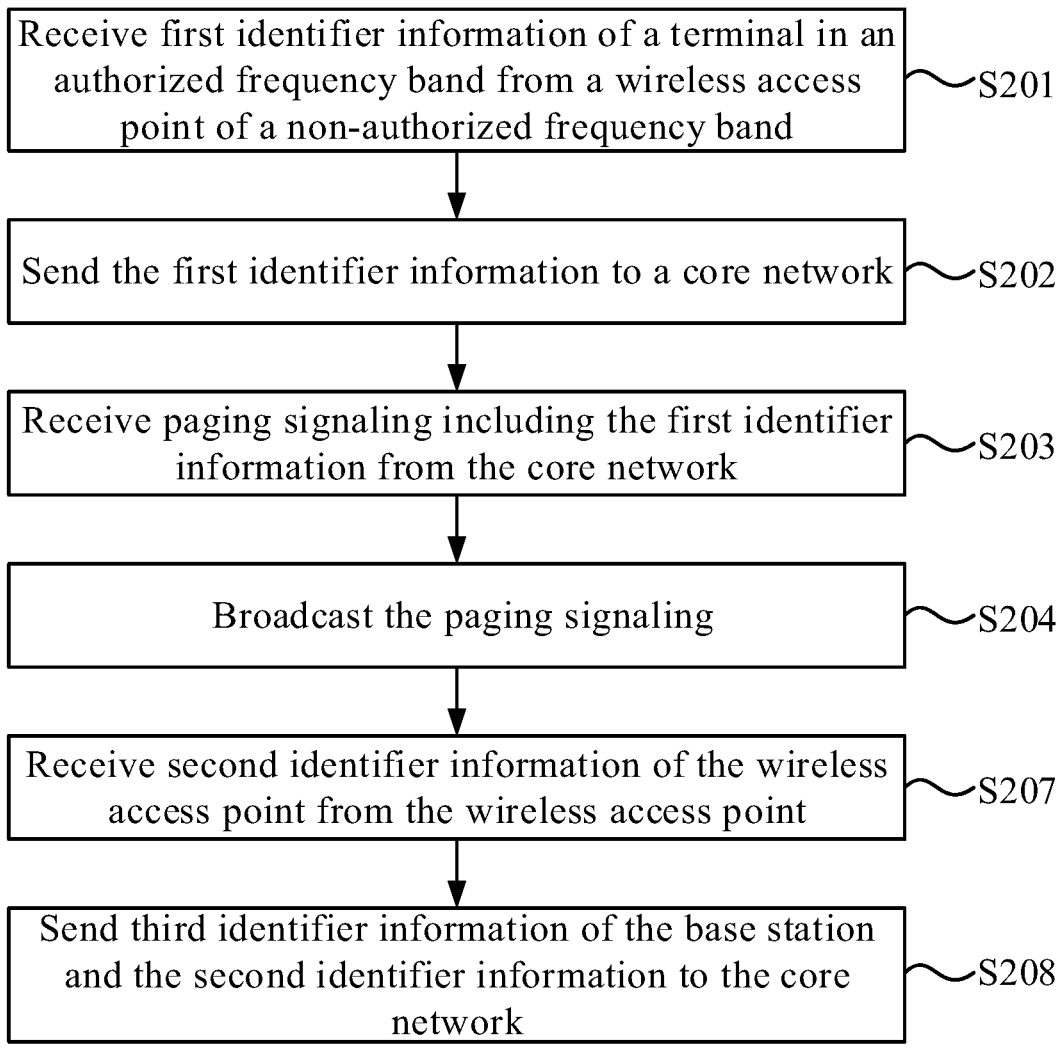
FIG. 16 is a flowchart illustrating another paging method according to an example of the present disclosure.

FIG. 16 is a flowchart illustrating another paging method according to an example of the present disclosure. As shown in FIG. 16, the method further includes the following steps.

At step S207, second identifier information of the wireless access point is received from the wireless access point.

At step S208, third identifier information of the base station and the second identifier information are sent to the core network.

In an example, the wireless access point may send its second identifier information to the base station, and the base station may send the second identifier information together with its third identifier information to the core network. The core network may pre-store an association relationship between identifier and position of base station, and an association relationship between identifier and position of wireless access point.

By sending the second identifier information and the third identifier information to the core network, the core network may determine a first position of the base station by querying, based on the third identifier information, for a position corresponding to the third identifier information in the association relationship between identifier and position of base station, and determine a second position of the wireless access point by querying, based on the second identifier information, for a position corresponding to the second identifier information in the association relationship between identifier and position of wireless access point.

It is noted that, the above steps S207 and S208 may be performed in a sequence adjusted based on actual requirements. For example, as shown in FIG. 16, the step S207 may be performed after the step S204 or performed together with the step S201 at the same time.

Figure 17:
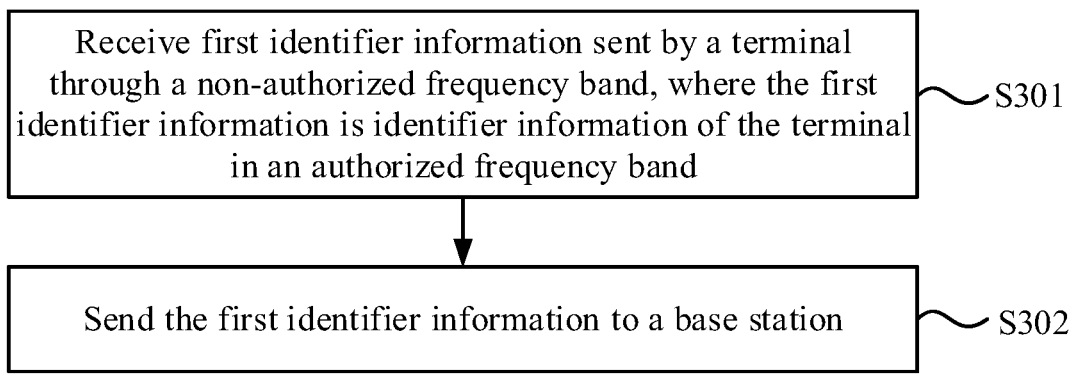
FIG. 17 is a flowchart illustrating an information sending method according to an example of the present disclosure.

FIG. 17 is a flowchart illustrating an information sending method according to an example of the present disclosure. The information sending method in this example may be applied to a wireless access point of a non-authorized frequency band. The non-authorized frequency band includes but not limited to a Wi-Fi frequency band and a Bluetooth frequency band and the like. With the Wi-Fi frequency band as the non-authorized frequency band, the wireless access point of the non-authorized frequency band may be a router. The non-authorized frequency band may be used to communicate with the base station according to any one of the above examples.

As shown in FIG. 17, the information sending method may include the following steps.

At step S301, first identifier information sent by a terminal through a non-authorized frequency band is received, where the first identifier information is identifier information of the terminal in an authorized frequency band.

At step S302, the first identifier information is sent to a base station.

In an example, the terminal may send its first identifier information in an authorized frequency band to the wireless access point of the non-authorized frequency band through the non-authorized frequency band, and the wireless access point may, after receiving the first identifier information from the terminal, send the first identifier information to the base station.

Further, the base station sends the first identifier information to a core network. Thus, the core network may, after receiving the first identifier information, determine which base stations send the received first identifier information and further send paging signaling to the base stations sending the first identifier information. Hence, the base stations sending the first identifier information can further broadcast the paging signaling to page the terminal.

Figure 18:
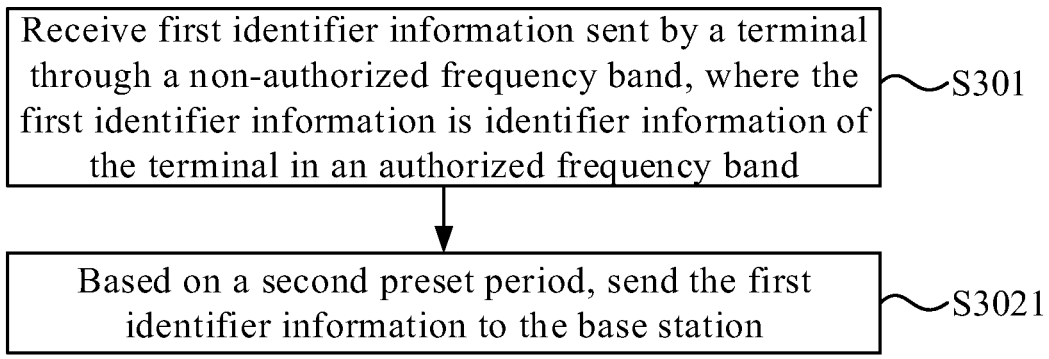
FIG. 18 is a flowchart illustrating another information sending method according to an example of the present disclosure.

FIG. 18 is a flowchart illustrating another information sending method according to an example of the present disclosure. As shown in FIG. 18, sending the first identifier information to the base station includes the following step.

At step S3021, based on a second preset period, the first identifier information is sent to the base station.

In an example, the wireless access point may send the first identifier information to the base station based on the second preset period, where the second preset period may be configured for the wireless access point by the terminal or the base station.

Figure 19:
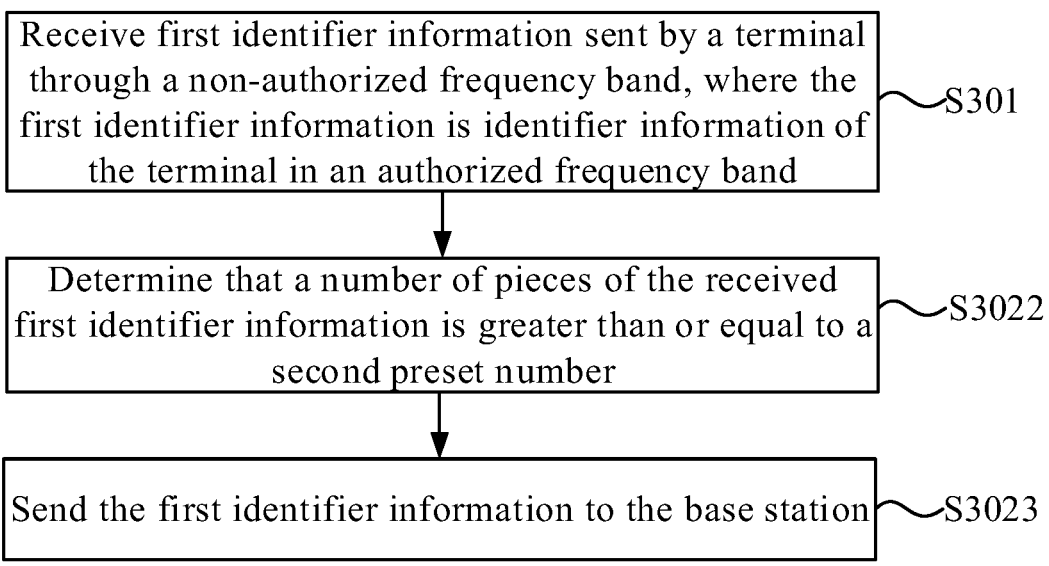
FIG. 19 is a flowchart illustrating another information sending method according to an example of the present disclosure.

FIG. 19 is a flowchart illustrating another information sending method according to an example of the present disclosure. As shown in FIG. 19, sending the first identifier information to the base station includes the following steps.

At step S3022, it is determined that a number of pieces of the received first identifier information is greater than or equal to a second preset number.

At step S3023, the first identifier information is sent to the base station.

In an example, the wireless access point may store the received first identifier information, and then send the stored first identifier information to the base station when the number of pieces of the stored first identifier information is large (for example, greater than or equal to the second preset number). In this way, it is helpful to reduce a communication frequency between the base station and the wireless access point. The second preset number may be configured for the wireless access point by the terminal or the base station.

Figure 20:
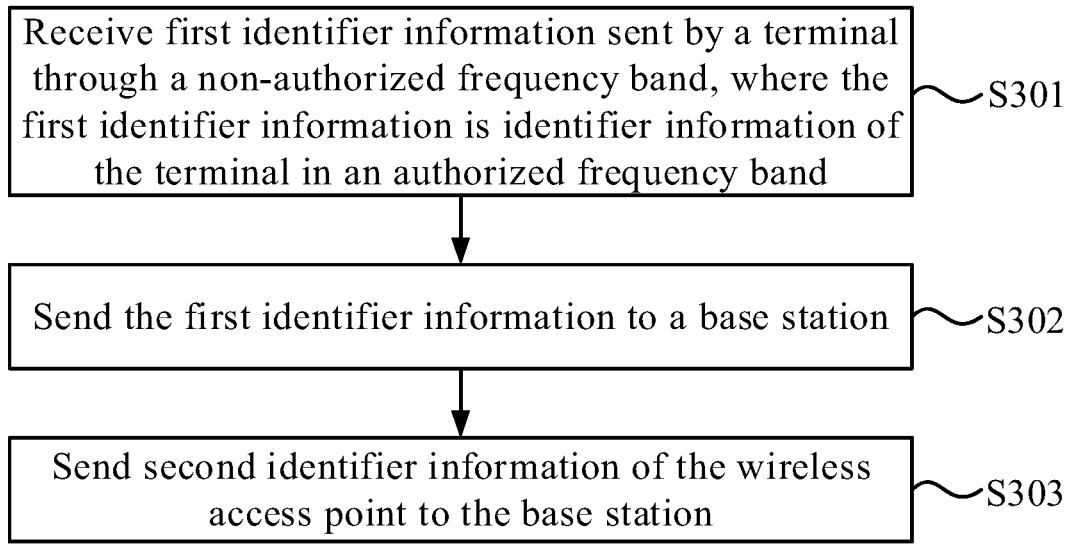
FIG. 20 is a flowchart illustrating another information sending method according to an example of the present disclosure.

FIG. 20 is a flowchart illustrating another information sending method according to an example of the present disclosure. As shown in FIG. 20, the method further includes the following step.

At step S303, second identifier information of the wireless access point is sent to the base station.

In an example, the wireless access point may send its second identifier information to the base station, and the base station may send the second identifier information to the core network. The core network may pre-store an association relationship between identifier and position of wireless access point.

By sending the second identifier information to the core network, the core network may determine a second position of the wireless access point by querying, based on the second identifier information, for a position corresponding to the second identifier information in the association relationship between identifier and position of wireless access point.

It is noted that, the above steps S303 and S302 may be performed in a sequence adjusted based on actual requirements. For example, as shown in FIG. 20, the step S303 may be performed after the step S302 or performed together with the step S302 at the same time.

Corresponding to the examples of the above method of sending paging signaling, paging method and information sending method, examples of an apparatus for sending paging signaling, a paging apparatus and an information sending apparatus are further provided in the present disclosure.

Figure 21:
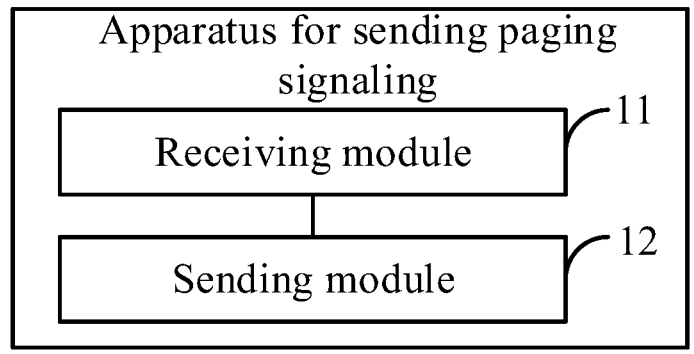
FIG. 21 is a diagram illustrating an apparatus for sending paging signaling according to an example of the present disclosure.

FIG. 21 is a diagram illustrating an apparatus for sending paging signaling according to an example of the present disclosure. The apparatus for sending paging signaling in this example may be applied to a core network. The core network may be a 4G core network or a 5G core network.

As shown in FIG. 21, the apparatus for sending paging signaling may include:
  a receiving module 11, configured to receive first identifier information of a terminal in an authorized frequency band from a base station;
  a sending module 12, configured to send a paging signaling including the first identifier information to the base station.

In some examples, the receiving module is further configured to receive state information of the terminal in the authorized frequency band from the base station.

In some examples, the sending module is further configured to send the paging signaling to an adjacent base station of the base station.

In some examples, the sending module is further configured to send the paging signaling to other base stations with a distance from the base station being less than or equal to a first preset distance.

Figure 22:
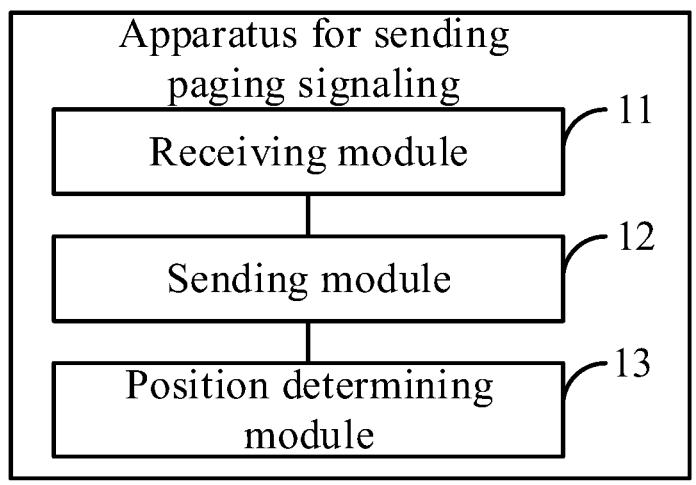
FIG. 22 is a diagram illustrating another apparatus for sending paging signaling according to an example of the present disclosure.

FIG. 22 is a diagram illustrating another apparatus for sending a paging signaling according to an example of the present disclosure. As shown in FIG. 22, the receiving module is further configured to receive second identifier information of a wireless access point and third identifier information of the base station from the base station.

The apparatus further includes:
  a position determining module 13, configured to, according to the third identifier information and an association relationship between identifier and position of base station, determine a first position of the base station, and according to the second identifier information and an association relationship between identifier and position of wireless access point, determine a second position of the wireless access point;
  where the sending module 12 is configured to, in response to that a distance between the second position and the first position is less than or equal to a second preset distance, send the paging signaling including the first identifier information to the base station.

Figure 23:
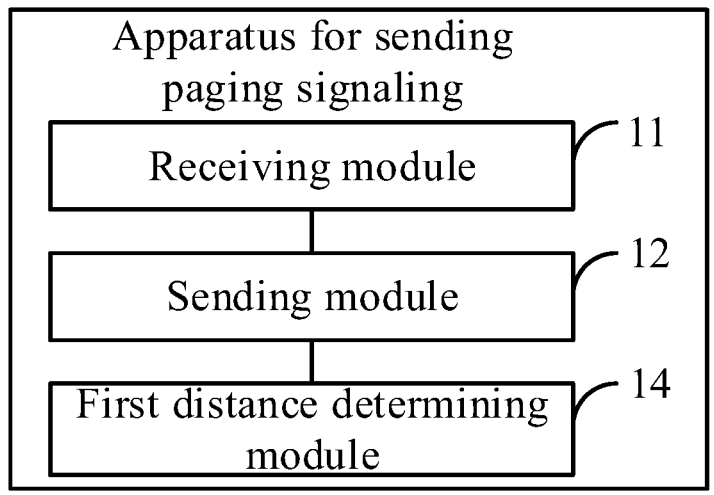
FIG. 23 is a diagram illustrating another apparatus for sending paging signaling according to an example of the present disclosure.

FIG. 23 is a diagram illustrating another apparatus for sending paging signaling according to an example of the present disclosure. As shown in FIG. 23, the apparatus further includes:
  a first distance determining module 14, configured to, in response to determining that the distance between the second position and the first position is greater than the second preset distance, determine a first target base station with a distance from the second position being less than or equal to the second preset distance;
  where the sending module 12 is further configured to send the paging signaling including the first identifier information to the first target base station.

Figure 24:
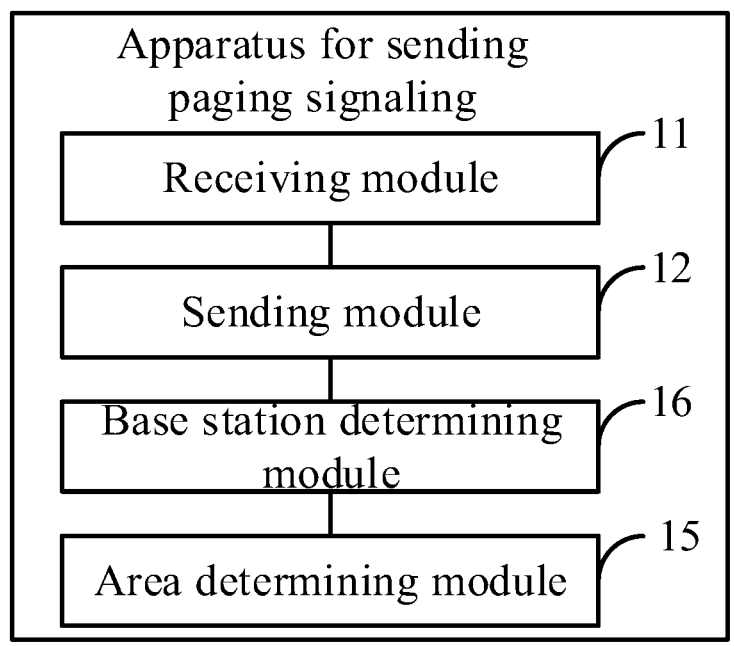
FIG. 24 is a diagram illustrating another apparatus for sending paging signaling according to an example of the present disclosure.

FIG. 24 is a diagram illustrating another apparatus for sending paging signaling according to an example of the present disclosure. As shown in FIG. 24, the apparatus further includes:
  an area determining module 15, configured to determine a tracking area of the terminal based on the first identifier information; and
  a base station determining module 16, configured to determine whether the base station is within the tracking area;
  where the sending module 12 is further configured to, in response to that the base station is within the tracking area, send the paging signaling including the first identifier information to the base station.

Figure 25:
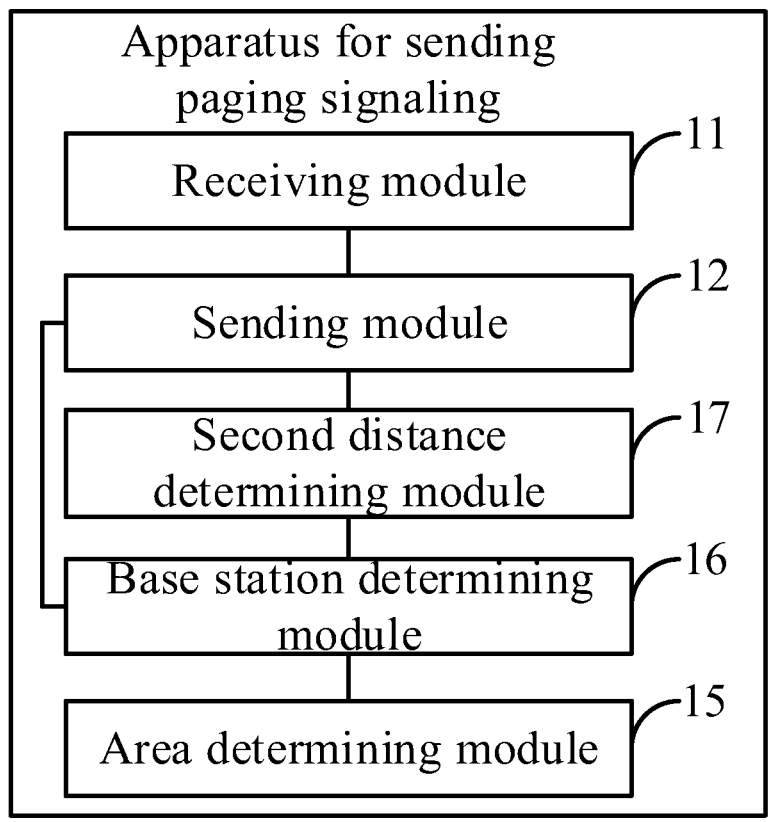
FIG. 25 is a diagram illustrating another apparatus for sending paging signaling according to an example of the present disclosure.

FIG. 25 is a diagram illustrating another apparatus for sending paging signaling according to an example of the present disclosure. As shown in FIG. 25, the apparatus further includes:
  a second distance determining module 17, configured to, in response to that the base station is outside the tracking area, determine, among the base stations in the tracking area, a second target base station with a distance from the second position being less than or equal to a third preset distance;
  where the sending module 12 is further configured to send the paging signaling including the first identifier information to the second target base station.

Figure 26:
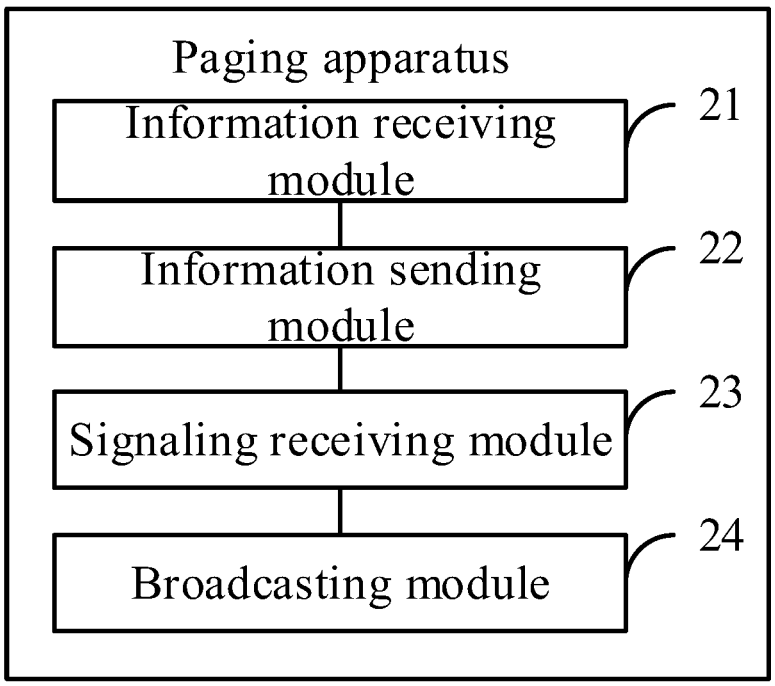
FIG. 26 is a diagram illustrating a paging apparatus according to an example of the present disclosure.

FIG. 26 is a diagram illustrating a paging apparatus according to an example of the present disclosure. The paging apparatus in this example may be applied to a base station. The base station may communicate with the core network according to any one of the above examples. The base station may also communicate with a wireless access point or terminal, for example, communicate with the terminal based on 4G protocol or 5G protocol.

As shown in FIG. 26, the paging apparatus may include:
  an information receiving module 21, configured to receive first identifier information of a terminal in an authorized frequency band from a wireless access point of a non-authorized frequency band;
  an information sending module 22, configured to send the first identifier information to a core network;
  a signaling receiving module 23, configured to receive paging signaling including the first identifier information from the core network;
  a broadcasting module 24, configured to broadcast the paging signaling.

In some examples, the information receiving module is further configured to receive state information of the terminal in the authorized frequency band from the wireless access point; the information sending module is further configured to send the state information to the core network.

In some examples, the information sending module is configured to, based on a first preset period, send the first identifier information to the core network.

In some examples, the information sending module is configured to determine that a number of pieces of the received first identifier information is greater than or equal to a first preset number; and send the first identifier information to the core network.

In some examples, the information receiving module is further configured to receive second identifier information of the wireless access point from the wireless access point; and the information sending module is further configured to send third identifier information of the base station and the second identifier information to the core network.

Figure 27:
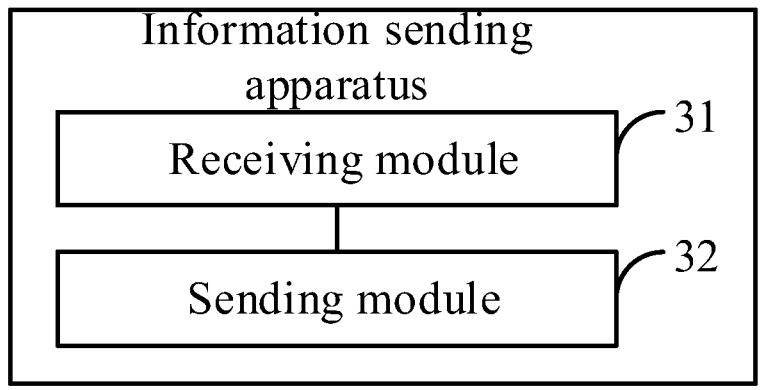
FIG. 27 is a diagram illustrating an information sending apparatus according to an example of the present disclosure.

FIG. 27 is a diagram illustrating an information sending apparatus according to an example of the present disclosure. The information sending apparatus in the example may be applied to a wireless access point of a non-authorized frequency band. The non-authorized frequency band includes but not limited to a Wi-Fi frequency band and a Bluetooth frequency band and the like. With the Wi-Fi frequency band as the non-authorized frequency band, the wireless access point of the non-authorized frequency band may be a router. The non-authorized frequency band may be used to communicate with the base station of any one of the above examples.

As shown in FIG. 27, the information sending apparatus may include:
- a receiving module 31, configured to receive first identifier information sent by a terminal through the non-authorized frequency band, where the first identifier information is identifier information of the terminal in an authorized frequency band;
- a sending module 32, configured to send the first identifier information to a base station.

In some examples, the sending module is configured to, based on a second preset period, send the first identifier information to the base station.

In some examples, the sending module is configured to determine that a number of pieces of the received first identifier information is greater than or equal to a second preset number; and send the first identifier information to the base station.

In some examples, the sending module is further configured to send second identifier information of the wireless access point to the base station.

The specific manner in which various modules in the apparatuses of the above examples of the present disclosure perform operations is already detailed in the method examples and will not be repeated herein.

Since the apparatus embodiments substantially correspond to the method embodiments, a reference may be made to part of the descriptions of the method embodiments for the related part. The apparatus embodiments described above are merely illustrative, where the modules described as separate members may be or not be physically separated, and the members displayed as modules may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

Figure 28:
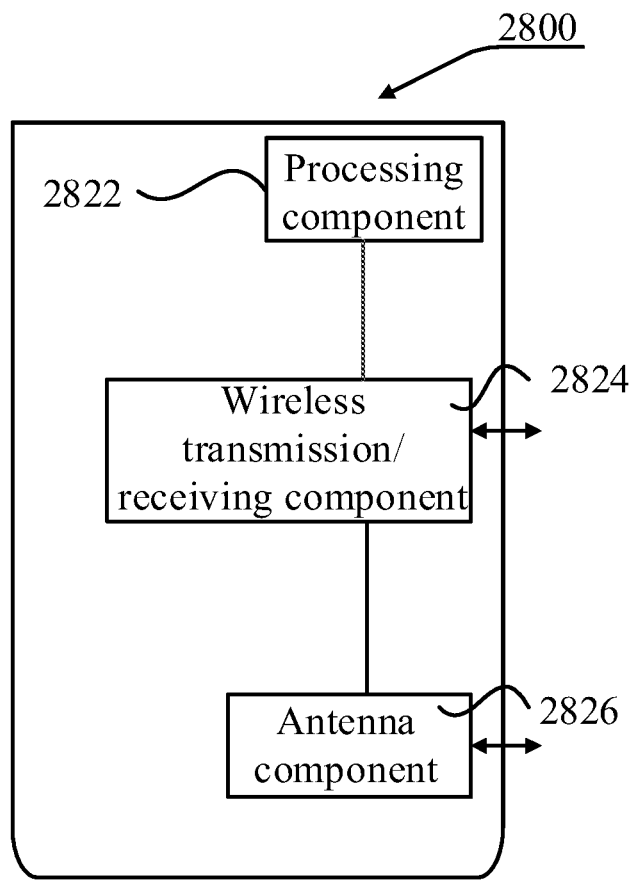
FIG. 28 is a diagram illustrating an apparatus for paging according to an example of the present disclosure.

FIG. 28 is a diagram illustrating an apparatus 2800 for paging according to an example of the present disclosure. The apparatus 2800 may be provided as a base station. As shown in FIG. 28, the apparatus 2800 includes a processing component 2822, a wireless transmission/receiving component 2824, an antenna component 2826, and a signal processing part specific to wireless interface. The processing component 2822 may further include a processor. One processor in the processing component 2822 may be configured to implement the paging method of any one of the above examples.

Figure 29:
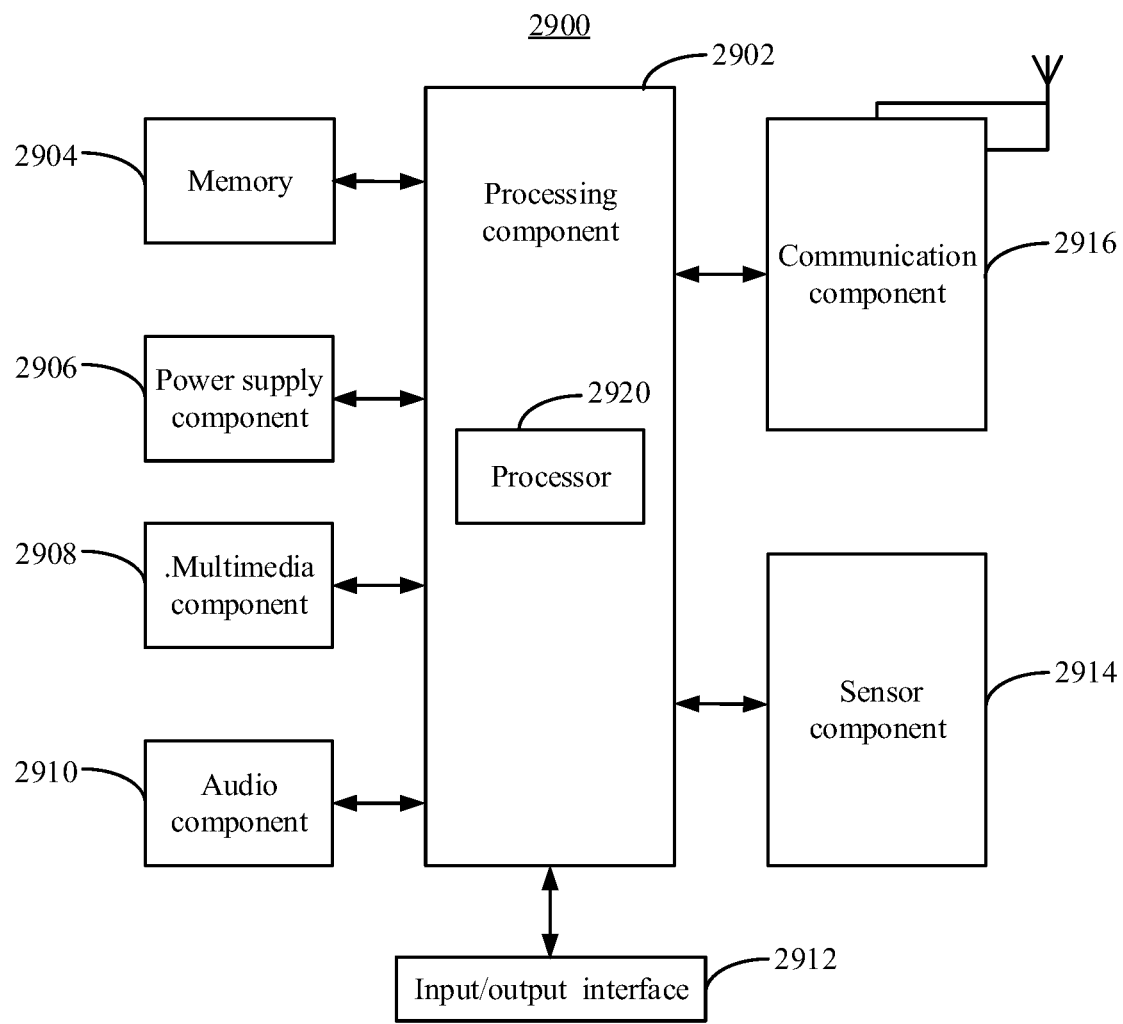
FIG. 29 is a diagram illustrating an apparatus for sending information according to an example of the present disclosure.

FIG. 29 is a diagram illustrating an apparatus 2900 for sending information according to an example of the present disclosure. For example, the apparatus 2900 may be a mobile phone, a computer, a digital broadcast terminal, a message transceiver, a game console, a tablet device, a medical device, a fitness device, a personal digital assistant, a router and the like.

With reference to FIG. 29, the apparatus 2900 may include one or more of the following components: a processing component 2902, a memory 2904, a power supply component 2906, a multimedia component 2908, an audio component 2910, an input/output (I/O) interface 2912, a sensor component 2914 and a communication component 2916.

The processing component 2902 generally controls overall operations of the apparatus 2900, such as operations associated with display, phone calls, data communications, camera operations, and recording operations. The processing component 2902 may include one or more processors 2920 to execute instructions to complete all or part of the steps of the above methods. In addition, the processing component 2902 may include modules which facilitate the interaction between the processing component 2902 and other components. For example, the processing component 2902 may include a multimedia module to facilitate the interaction between the multimedia component 2908 and the processing component 2902.

The memory 2904 is configured to store various types of data to support the operation of the apparatus 2900. Examples of such data include instructions for any application or method operated on the apparatus 2900, contact data, phonebook data, messages, pictures, videos, and so on. The memory 2904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2906 supplies power for different components of the apparatus 2900. The power supply component 2906 may include a power supply management system, one or more power supplies, and other components associated with generating, managing and distributing power for the apparatus 2900.

The multimedia component 2908 includes a screen that provides an output interface between the apparatus 2900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2908 includes a front camera and/or a rear camera. When the apparatus 2900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2910 is configured to output and/or input audio signals. For example, the audio component 2910 includes a microphone (MIC) configured to receive an external audio signal when the apparatus 2900 is in an operation mode, such as a call mode, a recording mode, and a voice recognition mode. The received audio signal may be further stored in the memory 2904 or transmitted via the communication component 2916. In some examples, the audio component 2910 also includes a loudspeaker for outputting an audio signal.

The I/O interface 2912 provides an interface between the processing component 2902 and a peripheral interface module which may be a keyboard, a click wheel, a button, or the like. These buttons may include, but are not limited to a home button, a volume button, a start button, and a lock button.

The sensor component 2914 includes one or more sensors for providing a status assessment in various aspects to the apparatus 2900. For example, the sensor component 2914 may detect an open/closed state of the apparatus 2900, and the relative positioning of components, for example, the component is a display and a keypad of the apparatus 2900. The sensor component 2914 may also detect a change in position of the apparatus 2900 or a component of the apparatus 2900, the presence or absence of a user in contact with the apparatus 2900, the orientation or acceleration/deceleration of the apparatus 2900 and a change in temperature of the apparatus 2900. The sensor component 2914 may include a proximity sensor configured to detect the presence of nearby objects without any physical contact. The sensor component 2914 may also include a light sensor, such as a CMOS or CCD image sensor, for use in imaging applications. In some examples, the sensor component 2914 may also include an acceleration sensor, a gyro sensor, a magnetic sensor, a pressure sensor, or a temperature sensor.

The communication component 2916 is configured to facilitate wired or wireless communication between the apparatus 2900 and other devices. The apparatus 2900 may access a wireless network based on a communication standard, such as WiFi, 2G or 3G, or a combination thereof. In an example, the communication component 2916 receives broadcast signals or broadcast associated information from an external broadcast management system via a broadcast channel. In an example, the communication component 2916 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 2900 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic elements for performing the above information sending method of any one of the above examples.

In an example, there is further provided a non-transitory computer readable storage medium including instructions, for example, a memory 2904 including instructions, where the above instructions may be executed by the processor 2920 of the apparatus 2900 to complete the above method. For example, the non-transitory computer readable storage medium may be Read Only Memory (ROM), Random Access Memory (RAM), CD-ROM, magnetic tape, floppy disk and optical data storage device and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements. The above are detailed descriptions of methods and apparatuses provided according to the embodiments of the present disclosure. Specific examples are used herein to set forth the principles and the implementations of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of sending paging signaling, comprising:
receiving, by a core network, first identifier information of a terminal in an authorized frequency band from a base station;
receiving, by the core network, second identifier information of a wireless access point and third identifier information of the base station from the base station, wherein the base station receives the first identifier information from the wireless access point;
according to the third identifier information and an association relationship between identifier and position of base station, determining, by the core network, a first position of the base station, and according to the second identifier information and an association relationship between identifier and position of wireless access point, determining a second position of the wireless access point; and
in response to determining that a distance between the second position and the first position is less than or equal to a second preset distance, sending, by the core network, paging signaling comprising the first identifier information to the base station.

2. The method of claim 1, further comprising:
receiving state information of the terminal in the authorized frequency band from the base station.

3. The method of claim 1, further comprising:
sending the paging signaling to an adjacent base station of the base station.

4. The method of claim 1, further comprising:
sending the paging signaling to other base stations having a distance less than or equal to a first preset distance from the base station.

5. The method of claim 1, further comprising:
in response to determining that the distance between the second position and the first position is greater than the second preset distance, determining a first target base station with a distance from the second position being less than or equal to the second preset distance; and
sending the paging signaling comprising the first identifier information to the first target base station.

6. The method of claim 1, further comprising:
according to the first identifier information, determining a tracking area of the terminal; and
determining whether the base station is located within the tracking area;
wherein in response to determining that the base station is located within the tracking area, sending the paging signaling comprising the first identifier information to the base station.

7. The method of claim 6, further comprising:
in response to determining that the base station is located outside the tracking area, determining, among base stations located within the tracking area, a second target base station with a distance from the second position being less than or equal to a third preset distance; and
sending the paging signaling comprising the first identifier information to the second target base station.

8. A paging method, comprising:
receiving, by a base station, first identifier information of a terminal in an authorized frequency band from a wireless access point of a non-authorized frequency band;
sending, by the base station, the first identifier information to a core network;
receiving, by the base station, paging signaling comprising the first identifier information from the core network;
broadcasting, by the base station, the paging signaling;
receiving, by the base station, second identifier information of the wireless access point from the wireless access point; and
sending, by the base station, third identifier information of the base station and the second identifier information to the core network, so that the core network determines a first position of the base station according to the third identifier information and an association relationship between identifier and position of base station, determines a second position of the wireless access point according to the second identifier information and an association relationship between identifier and position of wireless access point, and in response to determining that a distance between the second position and the first position is less than or equal to a second preset distance, sends the paging signaling comprising the first identifier information to the base station.

9. The method of claim 8, further comprising:
receiving state information of the terminal in the authorized frequency band from the wireless access point; and
sending the state information to the core network.

10. The method of claim 8, wherein sending the first identifier information to the core network comprises:
based on a first preset period, sending the first identifier information to the core network.

11. The method of claim 8, wherein sending the first identifier information to the core network comprises:
determining a number of pieces of the received first identifier information is greater than or equal to a first preset number; and
sending the first identifier information to the core network.

12. An information sending method, comprising:
receiving, by a wireless access point of a non-authorized frequency band, first identifier information sent by a terminal through the non-authorized frequency band, wherein the first identifier information is identifier information of the terminal in an authorized frequency band;
sending, by the wireless access point, the first identifier information to a base station; and
sending, by the wireless access point of a non-authorized frequency band, second identifier information of the wireless access point to the base station,
wherein the base station is configured to send third identifier information of the base station and the second identifier information to the core network, so that the core network determines a first position of the base station according to the third identifier information and an association relationship between identifier and position of base station, determines a second position of the wireless access point according to the second identifier information and an association relationship between identifier and position of wireless access point, and in response to determining that a distance between the second position and the first position is less than or equal to a second preset distance, sends the paging signaling comprising the first identifier information to the base station.

13. The method of claim 12, wherein sending the first identifier information to the base station comprises:
based on a second preset period, sending the first identifier information to the base station.

14. The method of claim 12, wherein sending the first identifier information to the base station comprises:
determining a number of pieces of the received first identifier information is greater than or equal to a second preset number; and
sending the first identifier information to the base station.

15. An electronic device, comprising:
a processor; and
a memory storing instructions executable by the processor;
wherein the processor is configured to implement the method of sending paging signaling according to claim 1.

16. An electronic device, comprising:
a processor; and
a memory storing instructions executable by the processor;
wherein the processor is configured to implement the paging method according to claim 8.

17. An electronic device, comprising:
a processor; and
a memory storing instructions executable by the processor;

wherein the processor is configured to implement the information sending method according to claim 12.

\* \* \* \* \*

UNITED STATES PATENT AND TRADEMARK OFFICE
CERTIFICATE OF CORRECTION

PATENT NO. : 12,256,367 B2
APPLICATION NO. : 17/776812
DATED : March 18, 2025
INVENTOR(S) : Wei Hong Page 1 of 1

It is certified that error appears in the above-identified patent and that said Letters Patent is hereby corrected as shown below:

In the Specification

In Column 3, Line 61, delete "is to use" and insert -- uses --, therefor.

In Column 17, Line 15, delete "to" and insert -- of --, therefor.

In Column 18, Lines 36-37, delete "understanding of" and insert -- understanding --, therefor.

Signed and Sealed this
Twenty-seventh Day of May, 2025

Coke Morgan Stewart
*Acting Director of the United States Patent and Trademark Office*